United States Patent
Cope et al.

(10) Patent No.: US 8,688,086 B1
(45) Date of Patent: Apr. 1, 2014

(54) PROVIDING SUPPLEMENTAL CONTENT TO WIRELESS COMMUNICATION DEVICES BASED ON DEVICE STATUS

(75) Inventors: Warren B. Cope, Olathe, KS (US); Bejoy Pankajakshan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 221 days.

(21) Appl. No.: 12/879,774

(22) Filed: Sep. 10, 2010

(51) Int. Cl.
 *H04M 3/42* (2006.01)
 *H04W 24/00* (2009.01)

(52) U.S. Cl.
 USPC ............... 455/414.2; 455/451; 455/456.2

(58) Field of Classification Search
 USPC ................................................ 455/414.2
 See application file for complete search history.

(56) References Cited

U.S. PATENT DOCUMENTS

| | | |
|---|---|---|
| 6,332,127 B1 | 12/2001 | Bandera et al. |
| 6,452,498 B2 | 9/2002 | Stewart |
| 6,545,596 B1 | 4/2003 | Moon |
| 6,608,556 B2 | 8/2003 | De Moerloose et al. |
| 6,647,269 B2 | 11/2003 | Hendrey et al. |
| 6,650,902 B1 | 11/2003 | Richton |
| 6,731,940 B1 | 5/2004 | Nagendran |
| 6,801,778 B2 | 10/2004 | Koorapaty et al. |
| 6,813,501 B2 | 11/2004 | Kinnunen et al. |
| 6,823,260 B1 | 11/2004 | Turcotte |
| 6,879,835 B2 | 4/2005 | Greene et al. |
| 6,912,398 B1 | 6/2005 | Domnitz |
| 7,027,801 B1 | 4/2006 | Hall et al. |
| 7,072,666 B1 | 7/2006 | Kullman et al. |
| 7,154,383 B2 | 12/2006 | Berquist |
| 2004/0106418 A1* | 6/2004 | Cini et al. .................. 455/466 |
| 2004/0219931 A1* | 11/2004 | Bi et al. .................... 455/456.1 |
| 2005/0021397 A1* | 1/2005 | Cui et al. ................... 705/14 |
| 2005/0085239 A1 | 4/2005 | Cedervall |
| 2006/0022048 A1 | 2/2006 | Johnson |
| 2006/0063536 A1* | 3/2006 | Kim et al. .................. 455/456.1 |
| 2006/0241859 A1 | 10/2006 | Kimchi et al. |
| 2006/0253453 A1 | 11/2006 | Chmaytelli et al. |
| 2006/0271281 A1 | 11/2006 | Ahn et al. |
| 2007/0026871 A1 | 2/2007 | Wager |
| 2007/0244750 A1 | 10/2007 | Grannan et al. |
| 2008/0070593 A1* | 3/2008 | Altman et al. ............. 455/457 |
| 2008/0119206 A1 | 5/2008 | Shalmon et al. |
| 2008/0133336 A1 | 6/2008 | Altman et al. |
| 2008/0176582 A1* | 7/2008 | Ghai et al. ................. 455/456.2 |
| 2008/0261571 A1* | 10/2008 | Zellner et al. ............. 455/414.1 |
| 2010/0040021 A1* | 2/2010 | Aso et al. ................... 370/331 |
| 2011/0035284 A1* | 2/2011 | Moshfeghi ................ 705/14.58 |

OTHER PUBLICATIONS

U.S. Appl. No. 12/886,277, filed Sep. 20, 2010.

* cited by examiner

*Primary Examiner* — Lester Kincaid
*Assistant Examiner* — Andy Gu

(57) ABSTRACT

What is disclosed is a method of operating a wireless communication system. The method includes receiving a registration request from a wireless communication device, and in response, monitoring device status and updating a data structure with device status data for the wireless communication device. The method also includes receiving a content request from the wireless communication device for primary content from a primary content provider, and in response, determining an anonymous key associated with the wireless communication device and transferring the anonymous key for delivery to a supplemental content provider. The method also includes receiving a device status request comprising the anonymous key transferred by the supplemental content provider, and in response, transferring the device status data from the data structure for delivery to the supplemental content provider. The method also includes receiving supplemental content transferred by the supplemental content provider responsive to the transferred device status data, receiving the primary content transferred by the primary content provider, and transferring the primary content and the supplemental content to the wireless communication device.

16 Claims, 5 Drawing Sheets

US 8,688,086 B1

PROVIDING SUPPLEMENTAL CONTENT TO WIRELESS COMMUNICATION DEVICES BASED ON DEVICE STATUS

TECHNICAL FIELD

Aspects of the disclosure are related to the field of communications, and in particular, providing supplemental content to wireless communication devices based on device status of wireless communication devices in wireless communication networks.

TECHNICAL BACKGROUND

Wireless communication systems typically include wireless access systems, with equipment such as base stations, which provide wireless access to communication services for user devices over wireless links. A typical wireless communication system includes systems to provide wireless access across a geographic region, with wireless coverage areas associated with individual base stations. The wireless access systems exchange user communications and overhead communications between wireless communication devices and service providers for the communication services.

Communication services typically include voice calls, data exchange, web pages, streaming media, or text messages, among other communication services. As a part of these communication services, content from service providers can be handled through the wireless communication system for receipt by users of wireless communication devices. Many times, primary content, such as the data requested by a user, is accompanied by supplemental content, such as emergency notifications, advertising content, weather alerts, or network alerts, among other supplemental content.

Overview

What is disclosed is a method of operating a wireless communication system. The method includes receiving a registration request from a wireless communication device, and in response, monitoring device status and updating a data structure with device status data for the wireless communication device. The method also includes receiving a content request from the wireless communication device for primary content from a primary content provider, and in response, determining an anonymous key associated with the wireless communication device and transferring the anonymous key for delivery to a supplemental content provider. The method also includes receiving a device status request comprising the anonymous key transferred by the supplemental content provider, and in response, transferring the device status data from the data structure for delivery to the supplemental content provider. The method also includes receiving supplemental content transferred by the supplemental content provider responsive to the transferred device status data, receiving the primary content transferred by the primary content provider, and transferring the primary content and the supplemental content to the wireless communication device.

What is also disclosed is a wireless communication system. The wireless communication device includes an access system configured to receive a registration request from a wireless communication device, and a control system configured to, in response the registration request, monitor device status and update a data structure with device status data for the wireless communication device. The access system is configured to receive a content request from the wireless communication device for primary content from a primary content provider. The control system is configured to, in response to the content request, determine an anonymous key associated with the wireless communication device and transfer the anonymous key for delivery to a supplemental content provider. The control system is configured to receive a device status request comprising the anonymous key transferred by the supplemental content provider, and in response, transfer the device status data from the data structure for delivery to the supplemental content provider. The access system is configured to receive supplemental content transferred by the supplemental content provider responsive to the transferred device status data, receive the primary content transferred by the primary content provider, and transfer the primary content and the supplemental content to the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
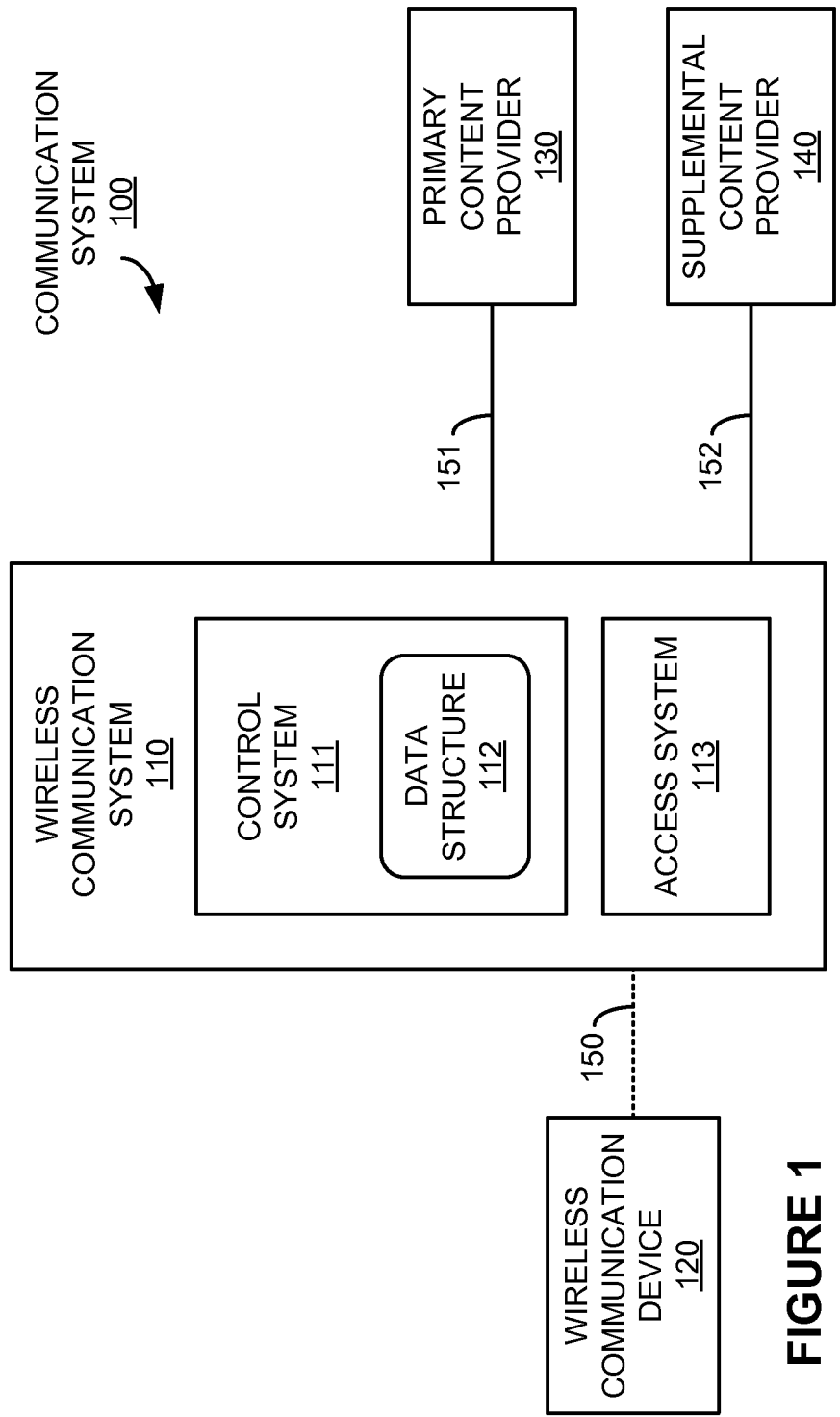
FIG. 1 is a system diagram illustrating a communication system.

FIG. 1 is a system diagram illustrating communication system 100. Communication system 100 includes wireless communication system 110, wireless communication device 120, primary content provider 130, and supplemental content provider 140. Wireless communication system 110 and wireless communication device 120 communicate over wireless link 150. Wireless communication system 110 and primary content provider 130 communicate over link 151. Wireless communication system 110 and supplemental content provider 140 communicate over link 152. In FIG. 1, wireless communication system 110 includes control system 111 and access system 113, which are communicatively coupled to each other in this example. Control system 111 includes data structure 112 in this example.

Figure 2:
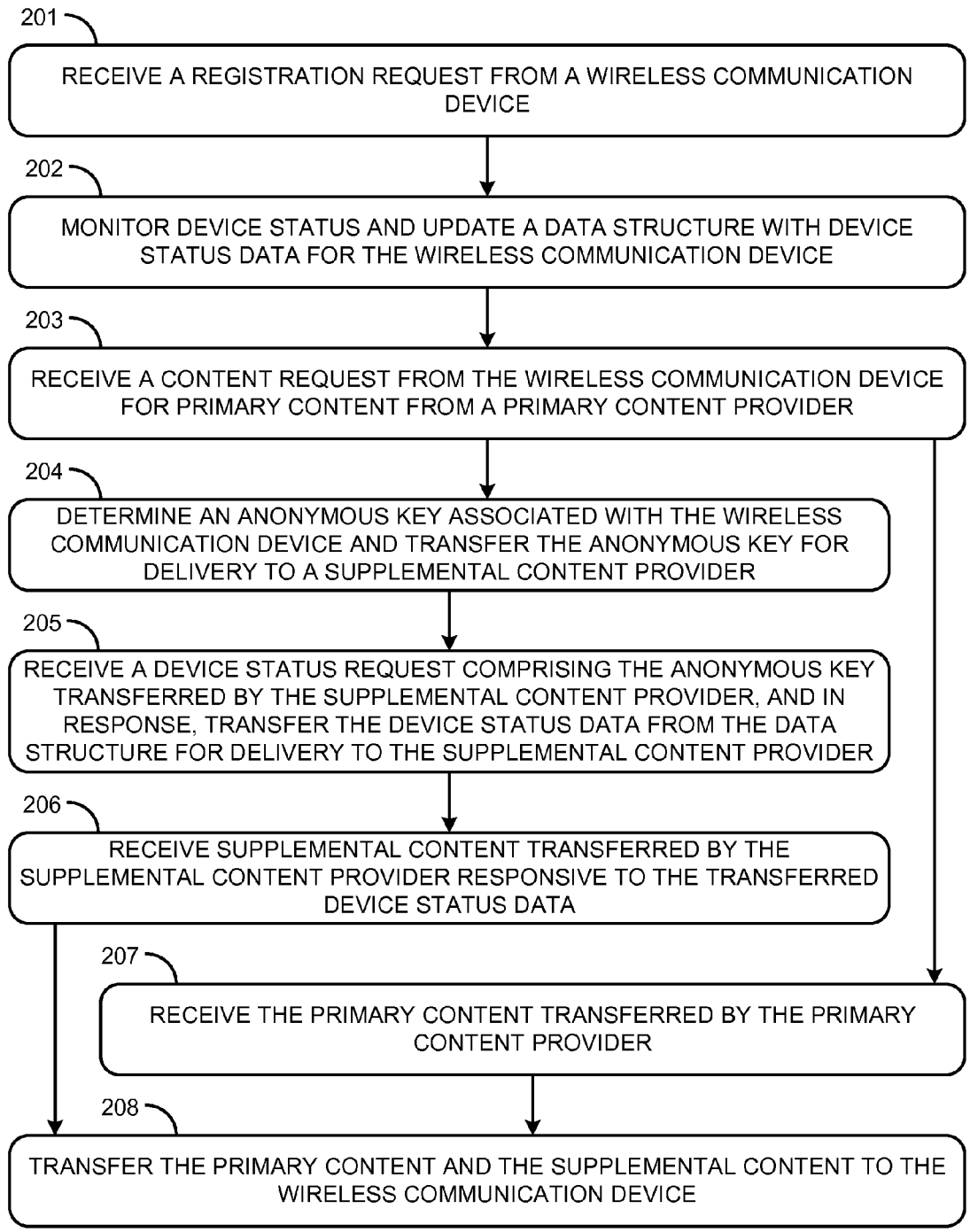
FIG. 2 is a flow diagram illustrating a method of operation of a wireless communication system.

FIG. 2 is a flow diagram illustrating a method of operation of wireless communication system 110. The operations of FIG. 2 are referenced herein parenthetically. In FIG. 2, wireless communication system 110 receives (201) a registration request from wireless communication device 120. The registration request could include a request to initiate a communication session with wireless communication system 110, handoff messaging for transferring service from a coverage area of wireless communication system 110 to another coverage area of wireless communication system 110, an initial registration of wireless communication device 120 with wireless communication system 110 after a device power-on, or other registration requests. In this example, access system 113 includes equipment and systems to provide wireless access to communication services for wireless communication devices, such as wireless communication device 120 over wireless link 150. Wireless communication device 120 could communicate with systems or equipment of access system 113 to transfer the registration request.

In response to the registration request, wireless communication system 110 monitors (202) device status and updates a data structure with device status data for wireless communication device 120. In this example, control system 111 monitors the device status in response to access system 113 receiving a registration request from wireless communication device 120. Control system 111 updates data structure 112 with the device status data for wireless communication device 120, although in other examples, access system 113 or data structure 112 could include equipment and systems to monitor the device status and update data structure 112 with the device status data. In this example, the device status is associated with a present location of wireless communication device 120, and the device status data includes a representation of the present location. As wireless communication device 120 moves, the present location is monitored by wireless communication system 110 and the device status data is updated in data structure 112. In other examples, the device status data could include a present time, an identifier of a wireless access node associated with wireless communication device 120, a sector location of wireless communication device 120, a velocity of wireless communication device 120, a device type of wireless communication device 120, a present RF signal quality associated with wireless communication device 120, or information associated with wireless link 150, including combinations thereof.

Wireless communication system 110 receives (203) a content request from wireless communication device 120 for primary content from a primary content provider. The content request could include a request by wireless communication device 120 for user content from a content provider, such as a data request, voice call, voice over Internet protocol (VoIP) call, web page, video stream, audio stream, or other content or communication session request. Access system 113 could receive the content request, and transfer the content request to control system 111 in some examples. In further examples, wireless communication system 110 transfers the content request for delivery to primary content provider 130 over link 151. Primary content provider 130 receives the content request transferred over link 151 in this example, however, it should be understood that link 151 could include intermediary links, such as the Internet, or other networks, links, or systems. The content request could include a content request unrelated to the registration request from wireless communication device 120 in operation 201. For example, a voice call or handoff could initiate the registration request, while a data session could initiate a content request unrelated to the voice call, although from the same wireless communication device.

In response to the content request, wireless communication system 110 determines (204) an anonymous key associated with wireless communication device 120 and transfers the anonymous key for delivery to supplemental content provider 140. In this example, the anonymous key is determined to be associated with wireless communication device 120, while maintaining anonymity of wireless communication device 120 or a user of wireless communication device 120. The anonymous key could be determined by hashing, encrypting, obfuscating, randomizing, or otherwise rendering anonymous or quasi-anonymous an identifier associated with wireless communication device 120, including combinations thereof. In other examples, the anonymous key could be generated by wireless communication system 110 and subsequently assigned as an anonymous key associated with wireless communication device 120. Supplemental content provider 140 receives the anonymous key transferred over link 152 in this example, however, it should be understood that link 152 could include intermediary links, such as the Internet, or other networks, links, or systems.

Wireless communication system 110 receives (205) a device status request comprising the anonymous key transferred by supplemental content provider 140, and in response, transfers the device status data from data structure 112 for delivery to supplemental content provider 140. In this example, the device status request, transferred by supplemental content provider 140, is received over link 152 by control system 111 or other systems associated with data structure 112. The device status data is responsively transferred for delivery to supplemental content provider 140 over link 152. As discussed above, the device status data is data associated with a present location of wireless communication device 120, and could include other information associated with wireless communication device 120. In typical examples, the device status data does not reveal an identity of the user of wireless communication device 120, or an identity of wireless communication device 120, through the anonymous key associated with wireless communication device 120. This anonymous key allows supplemental content provider 140 to obtain information about wireless communication device 120 without obtaining an identity of wireless communication device 120. An identity of wireless communication device 120 or user of wireless communication device 120 could include a phone number, network access identifier (NAI), electronic serial number (ESN), mobile equipment identifier (MEID), personal name, or billing address, among other information identifying a person or actual physical device.

Wireless communication system 110 receives (206) supplemental content transferred by supplemental content provider 140 responsive to the transferred device status data. The supplemental content, as transferred for delivery to wireless communication system 110 by supplemental content provider 140, is received over link 152, although other configurations could be employed. The supplemental content could include emergency notifications, advertising content, weather alerts, or network alerts, among other supplemental content. In some examples, the supplemental content is of a similar format or data type as the primary content requested from primary content provider, such as web pages, streaming content, audio information, video content, among other content types. In typical examples, the supplemental content is selected by supplemental content provider 140 responsive to the device status data, such as location-based supplemental content, device-type based supplemental content, or supplemental content related to both a present time and location of wireless communication device 120, among other selections responsive to the device status data.

Wireless communication system 110 receives (207) the primary content transferred by primary content provider 130. In this example, the primary content is received over link 151, although other configurations could be employed. The primary content includes the content requested by wireless communication device 120 or a user of wireless communication device 120 as described in operation 203. It should be understood that the primary content could be received at a varying time with respect to the supplemental content.

Wireless communication system 110 transfers (208) the primary content and the supplemental content to wireless communication device 120. In this example, the primary content and the supplemental content are transferred over wireless link 150. The primary content includes content responsive to the primary content request, while the supplemental content includes content responsive to the device status data. Wireless communication system 110 could combine the primary content with the supplemental content for transfer to wireless communication device 120. For example, if a web page was requested in the primary content request, the supplemental content could include advertising content and wireless communication system 110 could transfer the requested web page along with advertising content to wireless communication device 120 responsive to the primary content request. In further examples, the supplemental content is integrated into streaming content, such as streaming video content, animations, or streaming audio content for playback on wireless communication device 120. In yet further examples, the supplemental content can supercede or interrupt the primary content, such as when the supplemental content includes weather or emergency alerts.

Figure 3:
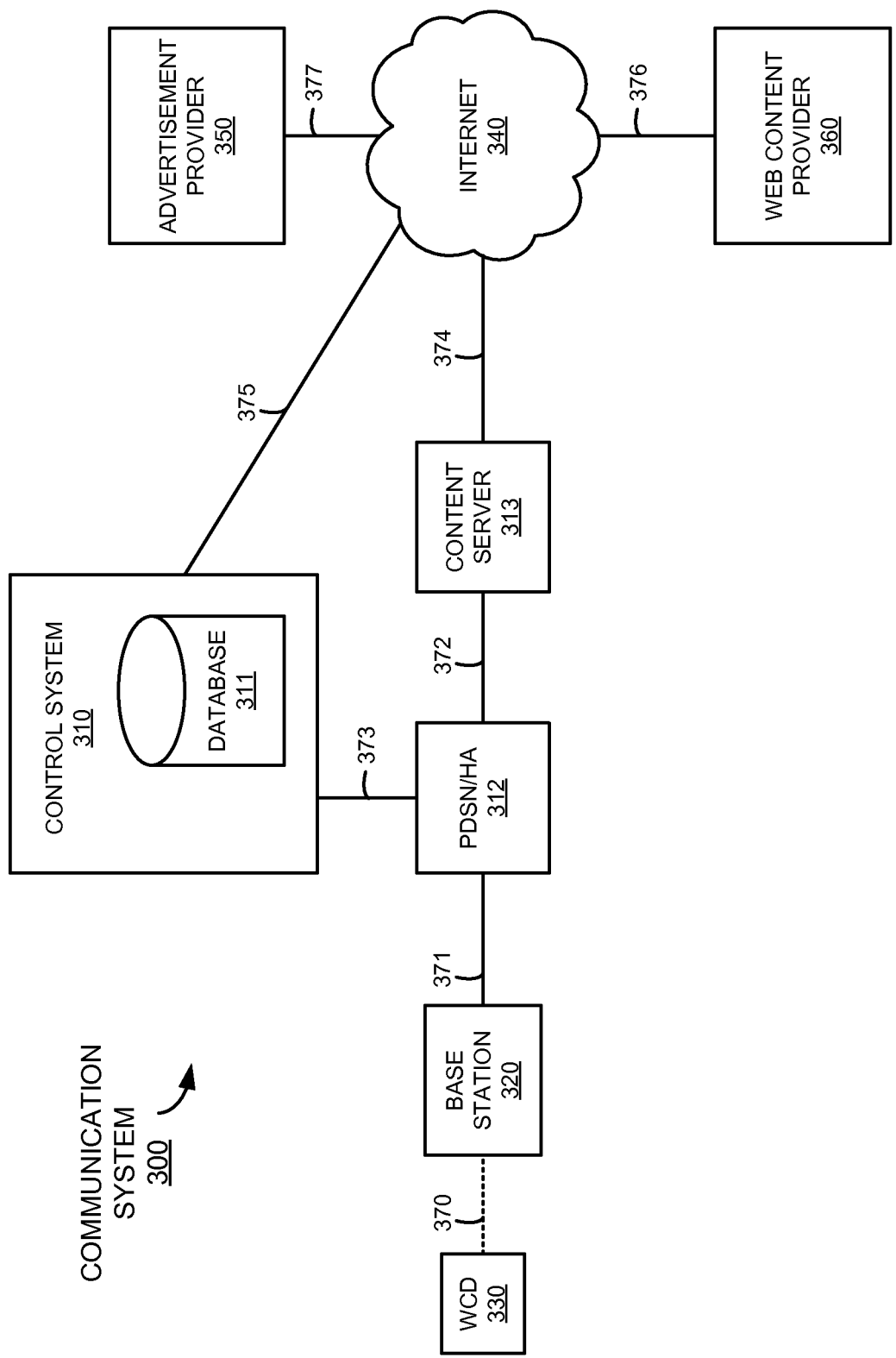
FIG. 3 is a system diagram illustrating a communication system.

FIG. 3 is a system diagram illustrating communication system 300. Communication system 300 includes control system 310, packet data switching node/home agent (PDSN/HA) 312, content server 313, base station 320, wireless communication device (WCD) 330, Internet 340, advertisement provider 350, and web content provider 360. Wireless communication device 330 and base station 320 communicate over wireless link 370. In this example, wireless access is provided by base station 320 to wireless communication device 330 using the Evolution Data Optimized (EV-DO) wireless protocol over wireless link 370, although other wireless communication protocols could be employed. PDSN/HA 312 communicates with base station 320 over link 371, a T1 backhaul link capable of carrying Internet protocol (IP) packets. Content server 313 and PDSN/HA 312 communicate over link 372, a local-area Ethernet network link. Control system 310 and PDSN/HA 312 communicate over link 373, a local-area Ethernet network link. Content server 313 and advertisement provider 350 communicate over Internet 340 and IP links 374 and 377. Content server 313 and web content provider 360 communicate over Internet 340 and IP links 374 and 376. Control system 310 and advertisement provider 350 communicate over Internet 340 and IP links 375 and 377 in this example.

PDSN/HA 312 includes equipment and systems for routing communications between base station 320 serving wireless communication devices and other systems, such as Internet 340 and content server 313. PDSN/HA 312 also includes equipment for monitoring and transferring device status data to control system 310. Although PDSN/HA 312 is shown as a packet data switching node/home agent in this example, PDSN/HA 312 could also comprise equipment such as base station controllers, packet routers, bridges, network gateways, or mobile switching centers, among other equipment and systems. Content server 313 includes computer systems, routers, processing equipment, and computer-readable storage media, to provide primary and supplemental content received from advertisement provider 350 and web content provider 360 to wireless communication devices. Control system 310 includes computer systems in this example, comprising processing equipment and computer-readable storage media, to receive device status data from PDSN/HA 312 as well as store, retrieve, and transfer the device status data in database 311 associated with a wireless communication device or anonymous key. Communication system 300 could also comprise a radio access network (RAN), wireless access system, or further base stations, control systems, servers, and databases to provide wireless access to communication services for wireless communication devices over a geographic area.

Figure 4:
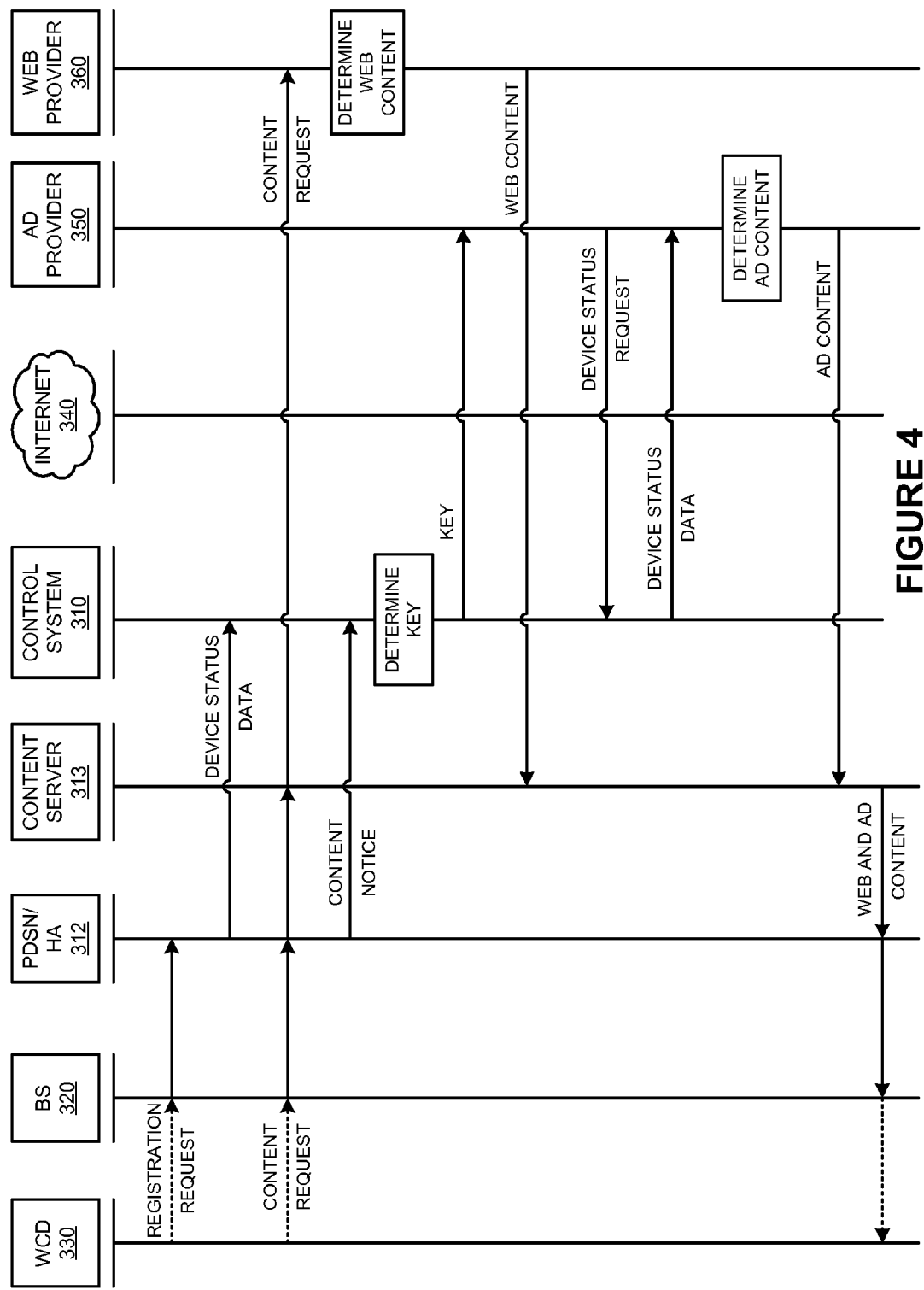
FIG. 4 is a sequence diagram illustrating a method of operation of a communication system.

FIG. 4 is a sequence diagram illustrating a method of operation of communication system 300. In FIG. 4, wireless communication device (WCD) 330 transfers a registration request to base station (BS) 320. In this example, the registration request is transferred by wireless communication device 330 over wireless link 370 in order to receive wireless access through base station 320, such as due to a device power-on or handoff from another base station. In other examples, the registration request includes a request to initiate a communication session with base station 320, such as a voice call, data session, email transfer, text message, video stream, audio stream, or other communication session. Base station 320 transfers this registration request to PDSN/HA 312. Responsive to the registration request, base station 320 and PDSN/HA 312 can coordinate with wireless communication device 330 to establish a communication session over wireless link 370, such as completing a registration or authentication process, assigning communication channels, frequencies, timeslots, or spreading codes for a communication session.

Also responsive to the registration request, PDSN/HA 312 monitors device status for wireless communication device 330 and transfers device status data related to the device status to control system 310 for storage in database 311. Although FIG. 4 shows the device status data being transferred to control system 310 during one instance, it should be understood that PDSN/HA 312 continues to monitor the device status of wireless communication device 330 and transfer associated device status data to control system 310. Control system 310 then stores the device status data in database 311 for later retrieval in a computer-readable storage medium, such as a hard drive, server, solid-state storage device, random-access memory, or memory cache, among other equipment. The device status data for wireless communication device 330 could be stored in database 311 according to an identifier associated with wireless communication device 330. In some examples, the identifier associated with wireless communication device 330 in database 311 reveals an identity of wireless communication device, such as a user name, phone number, network access identifier (NAI), electronic serial number (ESN), mobile equipment identifier (MEID), or other identifier associated with a person or physical device. In other examples, a pseudorandom identifier or an anonymous identifier is generated and used to associate the device status data with wireless communication device 330 in database 311 to protect an identity of a user or physical device.

The device status data could include information as discussed in FIG. 2 above, among other information. For example, the device status data could be associated with a present location of wireless communication device 330, and include a digital representation of the present location. A present location of wireless communication device 330 could include a present sector, present wireless coverage area, serving base station, geographic coordinates, or other location information. In other examples, the device status data could include a present time, a time in a present wireless coverage area, a time of entry into a present wireless coverage area, a velocity of wireless communication device 330, a device type of wireless communication device 330, a present RF signal quality associated with wireless communication device 330, or information associated with wireless link 370, including combinations thereof.

Base station 320 receives a content request from wireless communication device 330, and transfers the content request to PDSN/HA 312. PDSN/HA 312 transfers the content request to content server 313. In other examples, base station 320 transfers the content request to content server 313. In response to the content request, PDSN/HA 312 transfers a content notice to control system 310. The content notice indicates a content request is pending and could include information found in the content request, information about wireless communication device 330, or comprise the content request. The content request could be related or unrelated to the registration request transferred by wireless communication device 330. In this example, the content request includes a website address, such as an IP address, of a desired web page. In other examples, the content request could include a network address, streaming media channel identifier, telephone number, user identifier, user credentials, among other content or user identifiers. The content request indicates wireless communication device 330 desires content from a primary content provider, such as web content provider (web provider) 360 in this example. Content server 313 transfers the content request for delivery to web content provider 360, over Internet 340, although other systems may be involved in transferring the content request. In response to the content request, web content provider 360 determines web content for delivery to wireless communication device 330, and transfers the web content. Although FIG. 4 shows the web content being transferred shortly after the web content is determined by web content provider 360, it should be understood that the web content could be transferred at other times, as in examples when the web content requires additional time to be determined and transferred.

In response to the content notice, control system 310 determines an anonymous key to be associated with wireless communication device 330. In this example, the anonymous key is determined by applying a hashing process to the electronic serial number (ESN) of wireless communication device 330. The hashing process determines an identifier unrelated to the ESN to represent the ESN in an anonymous manner, such as generating a random or pseudo-random number based upon the ESN or other data, and then associating the hashed ESN with wireless communication device 330. The anonymous key allows wireless communication device 330 to be identified in an anonymous manner without revealing an actual identity of wireless communication device 330 or a user of wireless communication device 330. In some examples, the key is predetermined and assigned to wireless communication device 330 upon receipt of the content notice, while in other examples, the key is calculated in response to the content notice.

Once the key has been determined, control system 310 transfers the key for delivery to advertisement provider (ad provider) 350 over links 375 and 377 through Internet 340. Control system 310 associates the key with the device status data stored in database 311 for wireless communication device 330. In some examples, the key is added to database entries or referenced to database entries for the device status data for wireless communication device 330. In other examples, control system 310 determines the key when the device status data is begun to be stored in database 311, and transfers the key to ad provider 350 in response to the content notice. Ad provider 350 receives the key transferred by control system 310, over Internet 340 in this example. In response to the key transferred by control system 310, ad provider 350 transfers a device status request for delivery to control system 310. The device status request indicates a request for device status data for a wireless communication device, and includes a key as transferred to ad provider 350. In some examples, other systems in communication system 300 receive the device status request and transfer the device status request to control system 310, such as content server 313.

In response to the device status request transferred by ad provider 350, control system 310 transfers the device status data for the wireless communication device indicated by the key accompanying the device status request. Control system 310 transfers the device status data for delivery to ad provider 350 over Internet 340. In some examples, the key accompanies the device status data transferred for delivery to ad provider 350, to differentiate the device status data as being associated with the requested wireless communication device status data, such as wireless communication device 330, instead of a different wireless communication device. In examples with multiple wireless communication devices, ad provider 350 could concurrently transfer multiple device status requests for the multiple wireless communication devices as well as receive responses to the multiple requests. As discussed above, the device status data could include location or time-based information for wireless communication device 330, among other information. In this example, the device status data does not reveal an actual identity of wireless communication device 330, such as an identity of a user or actual physical device, and thus the identity of wireless communication device 330 is kept relatively anonymous from ad provider 350. However, the device status data does reveal information about wireless communication device 330 which allows ad provider 350 to make intelligent ad content choices based on the device status data.

Ad provider 350 then determines ad content based on the device status data for wireless communication device 330. This ad content could include ad content based on a present location, a time in a present location, a device type, brand, or model, or other information in the device status data for wireless communication device 330. The present location could indicate a present sector, base station, geographical coordinates, velocity or speed, among other location-based information for wireless communication device 330. A device type, model, or brand could be used to determine the ad content, such as determining a first ad content for users of a first model of wireless communication device, and a different ad content for users of other models of wireless communication devices. Time-based information in the device status data could also be used to determine the ad content. In examples of time-based information, the device status data could include a time of a wireless communication device is present in a sector of wireless coverage. Ad provider 350 could determine a first ad content for a wireless communication device which has recently entered into a new sector of wireless coverage, as indicated by the device status data transferred to ad provider 350 for that wireless communication device. A second ad content could be determined for a wireless communication device which has lingered in a sector of wireless coverage for a period of time greater than the recent wireless communication device. Different ad content could also be delivered to a single wireless communication device at different times while present in a single sector of wireless coverage, such as a first ad content when the wireless communication device makes a content request when newly entering the sector, and a second ad content when the wireless communication device makes a content request after remaining in the sector for a predetermined time. Ad provider 350 could pay different prices for ad content served to wireless communication devices based on the device status data, such as paying more for ads served to new wireless communication devices in a sector of wireless coverage, and paying less for ads served to wireless communication devices which linger in a sector of wireless coverage. Other examples of ad cost differentials could be determined, such as based on device model, past device status data, or other considerations. Other ad content determinations based on the device status data could be provided, including combinations thereof.

Additionally, the key transferred by control system 310 could be associated with wireless communication device 330 for only the present content request, such as a dynamic key which is re-determined for each content request. In other examples, the key transferred by wireless communication device 330 could be associated with wireless communication device 330 for a longer duration than the dynamic key, such as a static key for multiple content requests. In examples where a static key is employed, control system 310 or ad provider 350 could retain long-term device status data for wireless communication device 330, and ad provider 350 could determine ad content in response to present device status data as well as upon past transferred device status data from previous content requests. For example, long term device status data which indicates frequent visits within a particular wireless coverage area could trigger ad content based upon the long term visitation to that particular wireless coverage area by ad provider 350.

Once the ad content is determined by ad provider 350, the ad content is transferred by ad provider 350 for delivery to content server 313. The ad content is transferred over Internet 340 in this example. The key could accompany the ad content to associate the ad content with wireless communication device 330, or other identifiers could be used to associate the ad content with the device status data, such as a transaction identifier or network identifier. Control system 310 could also transfer the key to content server 313, among other information.

After receiving both the supplemental content, namely the ad content, and the primary content, namely the web content, content server 313 transfers the ad content and web content for delivery to wireless communication device 330 through base station 320. In this example, the primary content includes content responsive to the primary content request, while the supplemental content includes content responsive to the device status data. In some examples, the ad content and web content are merged into the content type of the primary content, such as when a banner advertisement from ad provider 350 accompanies a web page from web provider 360. In other examples, a separate ad content type than the primary content type is provided, such as when a streaming video content is received from web content provider 360 and a static overlay ad is provided by ad provider 350. A type of the primary content, as originally requested in the content request, could also be provided to ad provider 350 to allow ad provider 350 to select an ad content type based upon the primary content type. It should be understood that the ad content and the web content could be transferred at different times by content server 313 for delivery to wireless communication device 330. Web browser, rendering software, or media player applications of wireless communication device 330 could then merge the primary content with the supplemental content after receiving the web content and ad content from base station 320.

Figure 5:
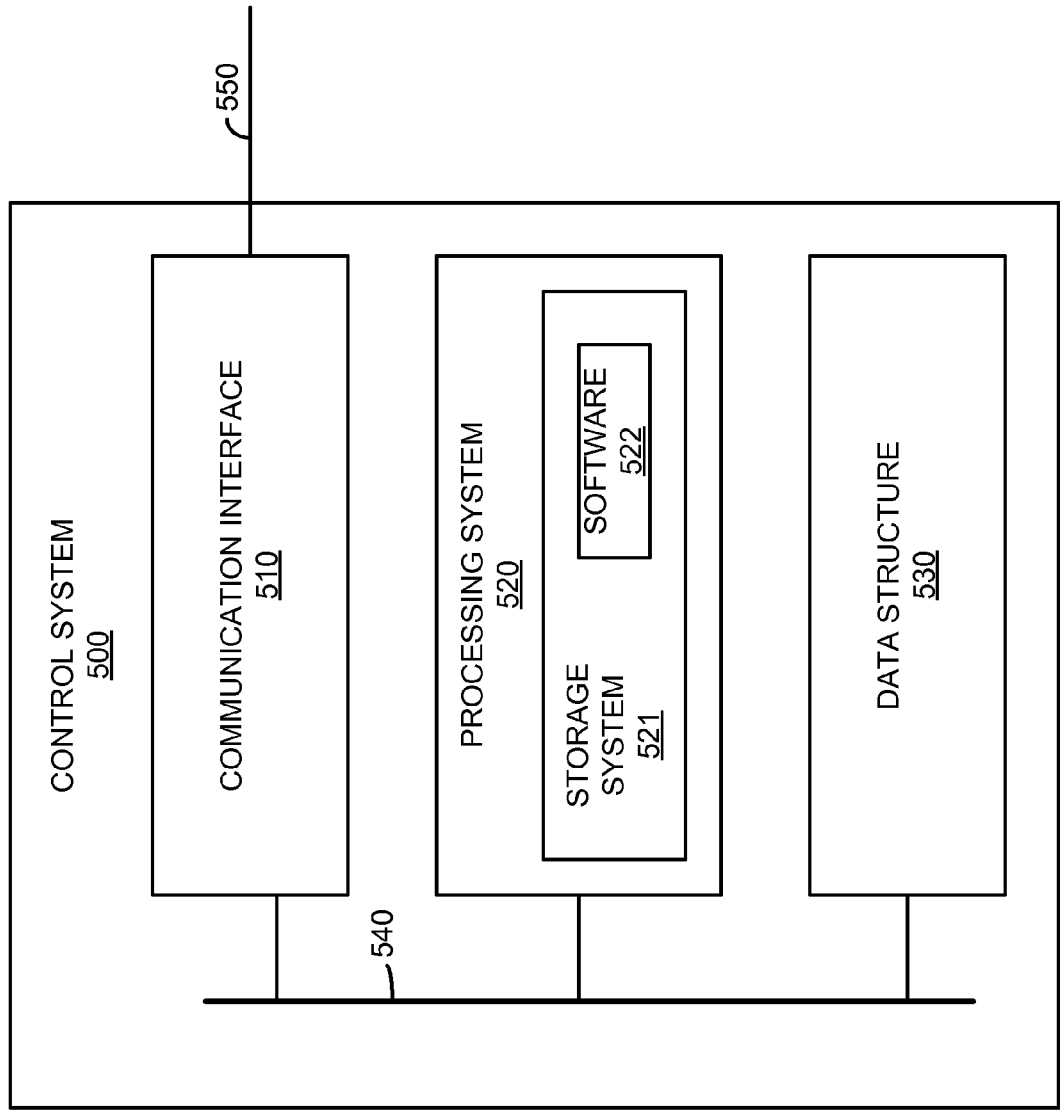
FIG. 5 is a block diagram illustrating a control system.

FIG. 5 is a block diagram illustrating control system 500, as an example of control system 111 found in FIG. 1 or control system 310 found in FIG. 3, although control system 111 or control system 310 could use other configurations. Control system 500 includes communication interface 510, processing system 520, and data structure 530. Communication interface 510, processing system 520, and data structure 530 communicate over bus 540. Control system 500 may be distributed among multiple devices that together form elements 510, 520-522, 530, 540, and 550.

Communication interface 510 comprises communication equipment for communicating over link 550, such as receiving content notices, device status information, or device status requests, and transferring device status data and associated keys. Communication interface 510 also receives command and control information and instructions from processing system 520 over bus 540. Link 550 could use various protocols or communication formats as described herein for links 150-152, 373, or 375, including combinations, variations, or improvements thereof.

Processing system 520 includes storage system 521. Processing system 520 retrieves and executes software 522 from storage system 521. In some examples, processing system 520 is located within the same equipment in which communication interface 510 or data structure 530 are located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as process device status requests and content notices, store and retrieve device status data with data structure 530, and determine keys associated with device status data, among other operations.

Data structure 530 comprises a computer-readable medium such as a disk, tape, integrated circuit, server, or some other memory device, and also may be distributed among multiple memory devices. Data structure 530 may include a database, operating system, logs, utilities, drivers, networking software, and other software typically loaded onto a computer system. Data structure 530 could contain an application program, firmware, or some other form of computer-readable processing instructions. Data structure 530 stores and retrieves device status data associated with wireless communication devices or keys.

Bus 540 comprises a physical, logical, or virtual communication link, capable of communicating data, control signals, and communications, along with other information. In some examples, bus 540 is encapsulated within the elements of communication interface 510, processing system 520, or data structure 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Referring back to FIG. 1, wireless communication system 110 includes control system 111, data structure 112, and access system 113. Wireless communication system 110 may also further comprise data modems, routers, servers, memory devices, software, databases, processing systems, cabling, network communication interfaces, physical structural supports, or other communication apparatuses.

Control system 111 comprises data structure 112 as well as systems and equipment for determine device status data associated with device status, storing device status data in a data structure, determining keys associated with user devices responsive to content request from the user devices, transferring device status data for delivery to supplemental content providers responsive to device status data requests, among other operations. Control system 111 also includes communication interfaces, as well as computer systems, microprocessors, circuitry, or some other processing devices or software systems, and may be distributed among multiple processing devices. Examples of control system 111 may also include software such as an operating system, logs, databases, utilities, drivers, networking software, and other software stored on a computer-readable medium. Control system 111 could also include location systems, application servers, application service provider systems, database systems, web servers, streaming media servers, authentication systems, or other systems.

In some examples, data structure 112 comprises a computer-readable medium for storing device status data for wireless communication device 120. Data structure 112 could be included in the equipment or systems of control system 111 or access system 113, or be included in separate equipment or systems. In examples of separate equipment or systems, data structure 112 could include communication interfaces, computer systems, microprocessors, circuitry, or other processing devices or software systems, and may be distributed among multiple processing devices. Examples of data structure 112 may also include software such as an operating system, logs, databases, utilities, drivers, networking software, and other software stored on a computer-readable medium. Data structure 112 could also include location systems, application servers, application service provider systems, database systems, web servers, or other systems.

Access system 113 comprises RF communication and control circuitry, antenna elements, and communication routing equipment and systems. The RF communication circuitry typically includes amplifiers, filters, RF modulators, transceivers, and signal processing circuitry. In many examples, wireless communication system 110 includes equipment to provide wireless access to communication services within different coverage areas to user devices such as wireless communication device 120 shown in FIG. 1, route communications between content providers and wireless communication devices, receive registration and content requests, monitor device status for user devices, determine device status data associated with the device status, communicate with control system 111 and data structure 112, or provide network information, handoff information, or configuration information to wireless communication devices, among other operations. Access system 113 may also comprise base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), Internet access nodes, telephony service nodes, wireless data access points, or other wireless communication equipment.

Wireless communication device 120 comprises radio frequency (RF) communication circuitry and antenna elements. The RF communication circuitry typically includes amplifiers, filters, modulators, and signal processing circuitry. In many examples, wireless communication device 120 includes circuitry and equipment to exchange communications of wireless communication services over wireless links with wireless access systems, transfer registration requests for wireless access, transfer content requests for communication services, and receive primary and supplemental content from a wireless communication system, among other operations. Wireless communication device 120 may also include user interface systems, memory devices, computer-readable storage mediums, software, processing circuitry, or other communication components. Wireless communication device 120 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Primary content provider 130 comprises systems and equipment for receiving content requests transferred by user devices, such as wireless communication devices, and providing primary content responsive to the content requests for delivery to user devices, among other operations. Primary content provider 130 also includes communication interfaces, as well as computer systems, microprocessors, circuitry, or some other processing devices or software systems, and may be distributed among multiple processing devices. Examples of primary content provider 130 may also include software such as an operating system, logs, databases, utilities, drivers, networking software, and other software stored on a computer-readable medium. Primary content provider 130 could also include application servers, application service provider systems, database systems, web servers, streaming media servers, authentication systems, or other systems.

Supplemental content provider 140 comprises systems and equipment for receiving keys associated with user devices from wireless communication systems, transferring device status data requests to the wireless communication systems, receiving device status data, and transferring supplemental content in response to receiving device status data for delivery to user devices, among other operations. Supplemental content provider 140 also includes communication interfaces, as well as computer systems, microprocessors, circuitry, or some other processing devices or software systems, and may be distributed among multiple processing devices. Examples of supplemental content provider 140 may also include software such as an operating system, logs, databases, utilities, drivers, networking software, and other software stored on a computer-readable medium. Supplemental content provider 140 could also include application servers, application service provider systems, database systems, web servers, streaming media servers, authentication systems, or other systems.

Wireless link 150 uses the air or space as the transport media. Wireless link 150 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WiFi), High Speed Packet Access (HSPA), Radio Link Protocol (RLP), or some other wireless communication format, including combinations, improvements, or variations thereof. Although one wireless link 150 is shown in FIG. 1, it should be understood that this wireless link is merely illustrative to show communications with wireless communication system 110.

Communication links 151-152 each use metal, glass, optical, air, space, or some other material as the transport media. Communication links 151-152 could each use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication links 151-152 could each be direct links or may include intermediate networks, systems, or devices, such as an Internet network, local area network (LAN), wide area network (WAN), social network, or other computer-based network. Communication links 151-152 may also each comprise optical networks, asynchronous transfer mode (ATM) networks, packet networks, metropolitan-area networks (MAN), or other network topologies, equipment, or systems, including combinations thereof.

Links 150-152 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:

receiving a registration request from a wireless communication device, and in response, monitoring device status and updating a data structure with device status data for the wireless communication device;

receiving a content request from the wireless communication device for primary content from a primary content provider, and in a control system of the wireless communication system, responsively determining an anonymous key associated with the wireless communication device that conceals an identity of the wireless communication device to an advertisement content provider and transferring the anonymous key for delivery to the advertisement content provider;

in the control system of the wireless communication system, receiving a device status request indicating the anonymous key transferred by the advertisement content provider, and in response, transferring the device status data with the anonymous key for delivery to the advertisement content provider;

in a content server of the wireless communication system, receiving advertisement content indicating the anonymous key transferred by the advertisement content provider responsive to the transferred device status data, and determining that the advertisement content is associated with the primary content for the wireless communication device based on at least processing the anonymous key to determine the identity of the wireless communication device;

in the content server of the wireless communication system, receiving the primary content transferred by the primary content provider; and transferring the primary content and the advertisement content to the wireless communication device using the identity of the wireless communication device.

2. The method of claim 1, wherein the device status data is associated with a present location of the wireless communication device.

3. The method of claim 1, wherein the device status data does not identify a user of the wireless communication device.

4. The method of claim 1, wherein the device status data comprises at least one of a present time, an identifier of a wireless access node associated with the wireless communication device, a sector location of the wireless communication device, a velocity of the wireless communication device, a device type of the wireless communication device, and a present RF signal quality associated with the wireless communication device.

5. The method of claim 1, wherein the content request comprises a web page request.

6. The method of claim 1, wherein the registration request of the wireless communication device comprises a handoff of the wireless communication device from a first wireless access node to a present wireless access node.

7. The method of claim 1, wherein the registration request of the wireless communication device comprises a voice call placed by wireless communication device.

8. The method of claim 1, wherein transferring the primary content and the advertising content to the wireless communication device comprises merging the primary content with the advertising content to create merged content and transferring the merged content to the wireless communication device.

9. A wireless communication system, comprising:

an access system configured to receive a registration request from a wireless communication device;

a control system configured to, in response the registration request, monitor device status and update a data structure with device status data for the wireless communication device;

the access system configured to receive a content request from the wireless communication device for primary content from a primary content provider;

the control system configured to, in response to the content request, determine an anonymous key associated with the wireless communication device that conceals an identity of the wireless communication device to an advertising content provider and transfer the anonymous key for delivery to the advertising content provider;

the control system configured to receive a device status request indicating the anonymous key transferred by the advertising content provider, and in response, transfer the device status data with the anonymous key for delivery to the advertising content provider; and the access system configured to receive advertising content with the anonymous key transferred by the advertising content provider responsive to the transferred device status data, and determine that the advertisement content is associated with the primary content for the wireless communication device based on at least processing the anonymous key to determine the identity of the wireless communication device;

the access system configured to receive the primary content transferred by the primary content provider, and transfer the primary content and the advertising content to the wireless communication device using the identity of the wireless communication device.

10. The wireless communication system of claim 9, wherein the device status data is associated with a present location of the wireless communication device.

11. The wireless communication system of claim 9, wherein the device status data does not identify a user of the wireless communication device.

12. The wireless communication system of claim 9, wherein the device status data comprises at least one of a present time, an identifier of a wireless access node associated with the wireless communication device, a sector location of the wireless communication device, a velocity of the wireless communication device, a device type of the wireless communication device, and a present RF signal quality associated with the wireless communication device.

13. The wireless communication system of claim 9, wherein the content request comprises a web page request.

14. The wireless communication system of claim 9, wherein the registration request of the wireless communication device comprises a handoff of the wireless communication device from a first wireless access node to a present wireless access node.

15. The wireless communication system of claim 9, wherein the registration request of the wireless communication device comprises a voice call placed by wireless communication device.

16. The wireless communication system of claim 9, wherein the access system is configured to merge the primary content with the advertising content to create merged content and transfer the merged content to the wireless communication device.

* * * * *